(12) United States Patent
Jiang et al.

(10) Patent No.: US 11,100,425 B2
(45) Date of Patent: Aug. 24, 2021

(54) FACILITATING DATA-DRIVEN MAPPING DISCOVERY

(71) Applicant: International Business Machines Corporation, Armonk, NY (US)

(72) Inventors: Jian Min Jiang, Beijing (CN); Pei Ni Liu, Beijing (CN); Yuan Ni, Shanghai (CN); Wen Sun, Beijing (CN); Guo Tong Xie, Xi Er Qi (CN); Jing Min Xu, Beijing (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 968 days.

(21) Appl. No.: 15/798,493

(22) Filed: Oct. 31, 2017

(65) Prior Publication Data
US 2019/0130309 A1  May 2, 2019

(51) Int. Cl.
*G06N 20/00* (2019.01)
*G06F 16/901* (2019.01)
*G06F 16/906* (2019.01)

(52) U.S. Cl.
CPC .......... *G06N 20/00* (2019.01); *G06F 16/901* (2019.01); *G06F 16/906* (2019.01)

(58) Field of Classification Search
CPC ...... G06N 20/00; G06F 16/906; G06F 16/901
See application file for complete search history.

(56) References Cited

U.S. PATENT DOCUMENTS

| 7,672,987 | B2 | 3/2010 | Mukherjee et al. |
| 2002/0128861 | A1 | 9/2002 | Lau et al. |
| 2004/0158567 | A1 | 8/2004 | Dettinger et al. |
| 2006/0089924 | A1* | 4/2006 | Raskutti ............... G06F 16/355 |
| 2008/0027930 | A1* | 1/2008 | Bohannon ............. G06F 16/285 |
| 2012/0011115 | A1* | 1/2012 | Madhavan ............ G06F 16/951 |
| | | | 707/723 |
| 2013/0246435 | A1* | 9/2013 | Yan ....................... G06F 16/355 |
| | | | 707/741 |

(Continued)

FOREIGN PATENT DOCUMENTS

WO    2014182725 A1    11/2014

OTHER PUBLICATIONS

Choi, et al., "Medical Concept Representation Learning from Electronic Health Records and its Application on Heart Failure Prediction," Submitted on Feb. 11, 2016, 3 pages.

(Continued)

*Primary Examiner* — Alan Chen
(74) *Attorney, Agent, or Firm* — Amin, Turocy & Watson, LLP

(57) ABSTRACT

Systems, computer-implemented methods and/or computer program products that facilitate automatically mapping different data types are provided. In one embodiment, a computer-implemented method comprises: constructing, by a system operatively coupled to a processor, an index from one or more classifier models for one or more data types; scoring and ranking, by the system, one or more candidate pairs for the one or more data types based on confidence score; and analyzing, by the system, how the one or more candidate pairs are scored and automatically generating the one or more classifier models used to construct the index.

14 Claims, 16 Drawing Sheets

(56) References Cited

U.S. PATENT DOCUMENTS

| | | | |
|---|---|---|---|
| 2013/0297661 A1* | 11/2013 | Jagota | G06F 16/11 707/822 |
| 2017/0109402 A1* | 4/2017 | Brewster | G06F 16/24537 |
| 2017/0371958 A1* | 12/2017 | Ganjam | G06N 7/005 |
| 2018/0075115 A1* | 3/2018 | Murray | G06F 16/2456 |
| 2018/0150548 A1* | 5/2018 | Shah | G06F 16/285 |
| 2020/0334020 A1* | 10/2020 | Seetharaman | G06F 3/0482 |

OTHER PUBLICATIONS

Ashish, et al., "The GAAIN Entity Mapper: An Active-Learning System for Medical Data Mapping," Jan. 13, 2016, 12 pages.

* cited by examiner

| Source Data | Common Model | Score | >threshold |
|---|---|---|---|
| C1 | medication | 0.95 | ➚ |
| C2 | HbA1c | 0.87 | ➚ |
| C3 | | | ✗ |

FIG. 7

FACILITATING DATA-DRIVEN MAPPING DISCOVERY

BACKGROUND

The subject disclosure relates to facilitating data-driven mapping discovery, and more specifically, automatically mapping different data types by employing machine learning based methods.

SUMMARY

The following presents a summary to provide a basic understanding of one or more embodiments of the invention. This summary is not intended to identify key or critical elements, or delineate any scope of the particular embodiments or any scope of the claims. Its sole purpose is to present concepts in a simplified form as a prelude to the more detailed description that is presented later. In one or more embodiments herein, devices, systems, computer-implemented methods, apparatus and/or computer program products that facilitate automatically mapping different data types by employing machine learning based methods.

According to one embodiment, a system is provided. The system can comprise a memory that stores computer executable components. The system can also comprise a processor, operably coupled to the memory, and that can execute computer executable components stored in the memory. The computer executable components can comprise an index component that can construct an index from one or more classifier models for one or more data types. The computer executable components can further comprise one or more scoring components that can score and rank one or more candidate pairs for the one or more data types based on confidence score. The computer executable components can further comprise a machine learning component that can analyze how the one or more candidate pairs are scored and automatically generate the one or more classifier models used to construct the index.

According to another embodiment, a computer-implemented method is provided. The computer-implemented method can comprise constructing, by a system operatively coupled to a processor, an index from one or more classifier models for one or more data types. The computer-implemented method can further comprise scoring and ranking, by the system, one or more candidate pairs for the one or more data types based on confidence score. The computer-implemented method can further comprise analyzing, by the system, how the one or more candidate pairs are scored and automatically generating the one or more classifier models used to construct the index.

According to another computer program product facilitating automatically mapping different data types is provided. The computer program product can comprise a computer readable storage medium having program instructions embodied therewith. The program instructions can be executable by a processor to cause the processor to construct an index from one or more classifier models for one or more data type. The program instructions can further be executable by a processor to cause the processor to score and rank one or more candidate pairs for the one or more data types based on confidence score. The program instructions can further be executable by a processor to cause the processor to analyze how the one or more candidate pairs are scored and automatically generate the one or more classifier models used to construct the index.

DESCRIPTION OF THE DRAWINGS

FIG. 7 illustrates a block diagram of an example, non-limiting methodology facilitating scoring candidate pairs in accordance with one or more embodiments described herein.

DETAILED DESCRIPTION

The following detailed description is merely illustrative and is not intended to limit embodiments and/or application or uses of embodiments. Furthermore, there is no intention to be bound by any expressed or implied information presented in the preceding Background or Summary sections, or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

Figure 1:
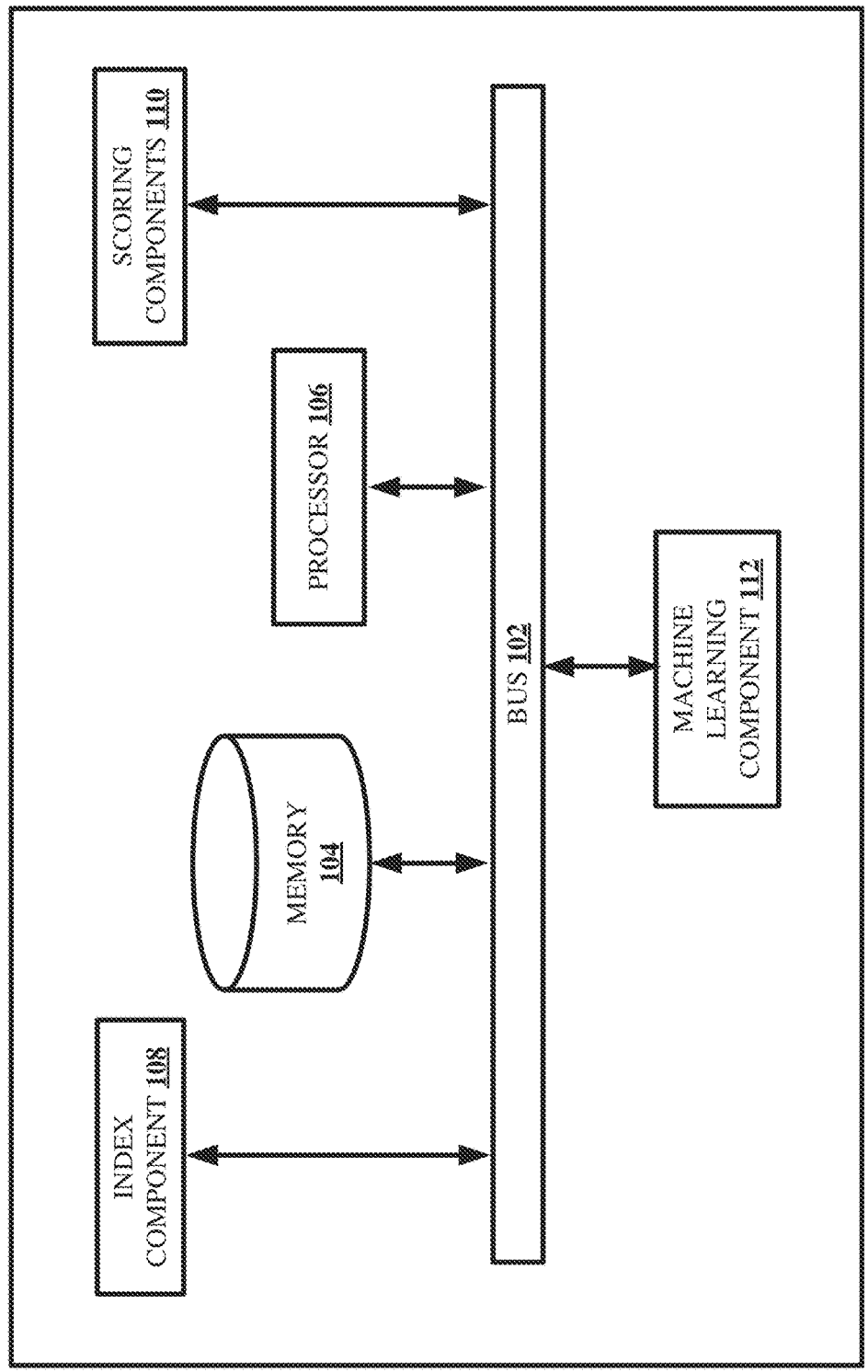
FIG. 1 illustrates a block diagram of an example, non-limiting system facilitating automatically mapping different data types in accordance with one or more embodiments described herein.

One or more embodiments described herein can generate one or more classifier models used by the system to facilitate automatically mapping different data types. FIG. 1 illustrates a block diagram of an example, non-limiting system 100 that can facilitate automatically mapping different data types in accordance with one or more embodiments described herein. Aspects of systems (e.g., system 100 and the like), apparatuses or processes explained in this disclosure can constitute one or more machine-executable components embodied within one or more machines, e.g., embodied in one or more computer readable mediums (or media) associated with one or more machines. Such components, when executed by the one or more machines, e.g., computers, computing devices, virtual machines, etc., can cause the machines to perform the operations described.

In various embodiments, the system 100 can be any type of component, machine, device, facility, apparatus, and/or instrument that comprises a processor. In some embodiments, system 100 is capable of effective and/or operative communication with a wired and/or wireless network. Components, machines, apparatuses, devices, facilities, and/or instrumentalities that can comprise the system 100 can include, but are not limited to, tablet computing devices, handheld devices, server class computing machines and/or databases, laptop computers, notebook computers, desktop computers, cell phones, smart phones, consumer appliances and/or instrumentation, industrial and/or commercial devices, digital assistants, multimedia Internet enabled phones, multimedia players, and the like.

As illustrated in FIG. 1, the system 100 can comprise bus 102, memory 104, processor 106, index component 108, scoring components 110 and/or machine learning component 114. The bus 102 can provide for interconnection of various components of the system 100. The memory 104 and processor 106 can carry out computation and/or storage operations of the system 100 as described herein. It is to be appreciated that in some embodiments one or more system components can communicate wirelessly with other components, through a direct wired connection or integrated on a chipset.

In one or more embodiments described herein of system 100, predictive analytics can be used to automatically generate one or more classifier models used by the system 100 to facilitate automatically mapping different data types. For example, the automatic generation can be based on information retained in a knowledgebase. As used herein, the term "knowledgebase" can be a database or other storage location or repository that can store one or more types of information. All such embodiments are envisaged.

The knowledgebase can comprise information related to one or more candidate pairs. In some embodiments, the information related to the one or more candidate pairs can be gathered over time and retained in the knowledgebase. In some embodiments, the information gathered can include confidence scores and/or classifier models. Based on the obtained information, the system 100 can evaluate the knowledgebase (or multiple knowledgebases) and generate one or more patterns and/or can map information known about the candidate pair to the information known about other candidate pairs. The predictive analytics of system 100 can determine that, if information of the candidate pair is similar to one or more other candidate pairs, the classifier models of the similar candidate pairs can be utilized to facilitate automatically mapping different data types.

The computer processing systems, computer-implemented methods, apparatus and/or computer program products described herein can employ hardware and/or software to generate classifier models that are highly technical in nature, that are not abstract and that cannot be performed as a set of mental acts by a human. For example, the one or more embodiments can perform the lengthy and complex interpretation and analysis on a copious amount of available information to generate classifier models and determine which classifier models from the one or more classifier models should be utilized for a candidate pair. In another example, the one or more embodiments can perform predictive analytics on a large amount of data to facilitate automatically mapping different data types with a high level of accuracy, even in the absence of detailed knowledge about the candidate pair. Accuracy can be evaluated by comparing a training set with a test set. After training a model employing a training set, accuracy can be calculated using a test set by computing percentage of output generated by the model running on the training set elements that matches a predicted target.

In various embodiments, the index component 108 can construct an index from the classifier models for the data types. The index can be built by using tuples with different data types, thresholds, trained models, etc. As used herein, the term "classifier," "models," "classifier models," "trained models" and "training data" can be used interchangeably to mean machine learning models. For example, to learn from the data, the index component 108 can build an index from training data for one or more data types. In response to the test data (e.g., input data, new data, data, medical data, etc.) being applied to the models to be predicted, the data type can be detected. Based on the data type (e.g., textual, non-textual, numeric, non-numeric, etc.) or based on semantic, the models can be searched and compared with the test data. For a column of new data set, the index can be searched to find candidate pairs (e.g., sets of data). The candidate pairs can be scored and ranked based on the type of data (e.g., textual data, numerical data, etc.). If the confidence score is equal to or greater than a defined threshold, which are usually chosen for best performance, the test data can be considered as similar to the model. The training data can be selected for training the models based on the data type. For example, for textual data, the training data are selected by different conceptual models (e.g., conceptual names, attributes, etc.). For example, MedicationName can be selected from medication data and related features such as chemical names, medication and/or medication form, etc.

The scoring components 110 can score and rank the candidate pairs (e.g., sets of data) for one or more data types based on confidence score. For textual data, the confidence score can be the support vector machine (SVM) score or logistic sigmoid score. For numerical data, the confidence score can be the p-value for the Kolmogorov-Smirnov test. The area under receiver operating characteristic (ROC) curve (collectively, AUC) can be used for performance of the classification. The candidate pairs that are scored at a value equal to or greater than a defined threshold can be considered to be similar to the model. Data on how the candidate pairs are scored and ranked by the scoring components can be collected by the machine learning component 112. The collected scoring and ranking data can be utilized by the machine learning component 112 to automatically generate maps. The generated maps can be employed by the machine learning component 112 to analyze how the candidate pairs are scored and ranked. Based on the analysis of how the candidate pairs are scored and ranked, the machine learning component 112 can automatically generate the classifier models used to construct the index.

The machine learning component 112 can select the candidate pairs to be used as training data (e.g., mapped and constructed into classifier models) to train the classifier models. The selection of candidate pairs to train classifier models can be based on the analysis of how the candidate pairs are scored. Candidate pairs are scored and ranked by comparing the confidence score of a candidate pair to the confidence score of the classifier model. It is appreciated that there can be more than one data type, more than one classifier model and more than one confidence score. The training can be performed on candidate pairs with confidence scores equal to or greater than the defined threshold, which can be considered to be similar to the models. The different data types can have different defined thresholds, so the selection and analysis are conducted separately for the data types. More specifically, the analysis can be a comparison of different classifier models for the data types. The candidate pairs with high confidence scores (e.g., high priority levels) are employed in the selection of the candidate pairs to be used as training data to train classifier models. However, the scoring parameters and the defined threshold can be modified by the scoring components 110 if there are few (e.g., less than a defined value) candidate pairs selected to train the classifier models. Furthermore, the machine learning component 112 can also construct new classifier models if the confidence scores of the candidate pairs for the data types are below the defined threshold or defined thresholds, as there can be different thresholds for different data types. Classifier models that are textual data can be generated based on the confidence score from the support vector machines or deep learning classification. For numerical data, the classifier models can be generated based on the confidence score from the Kolmogorov-Smirnov test or histogram similarity.

Figure 2:
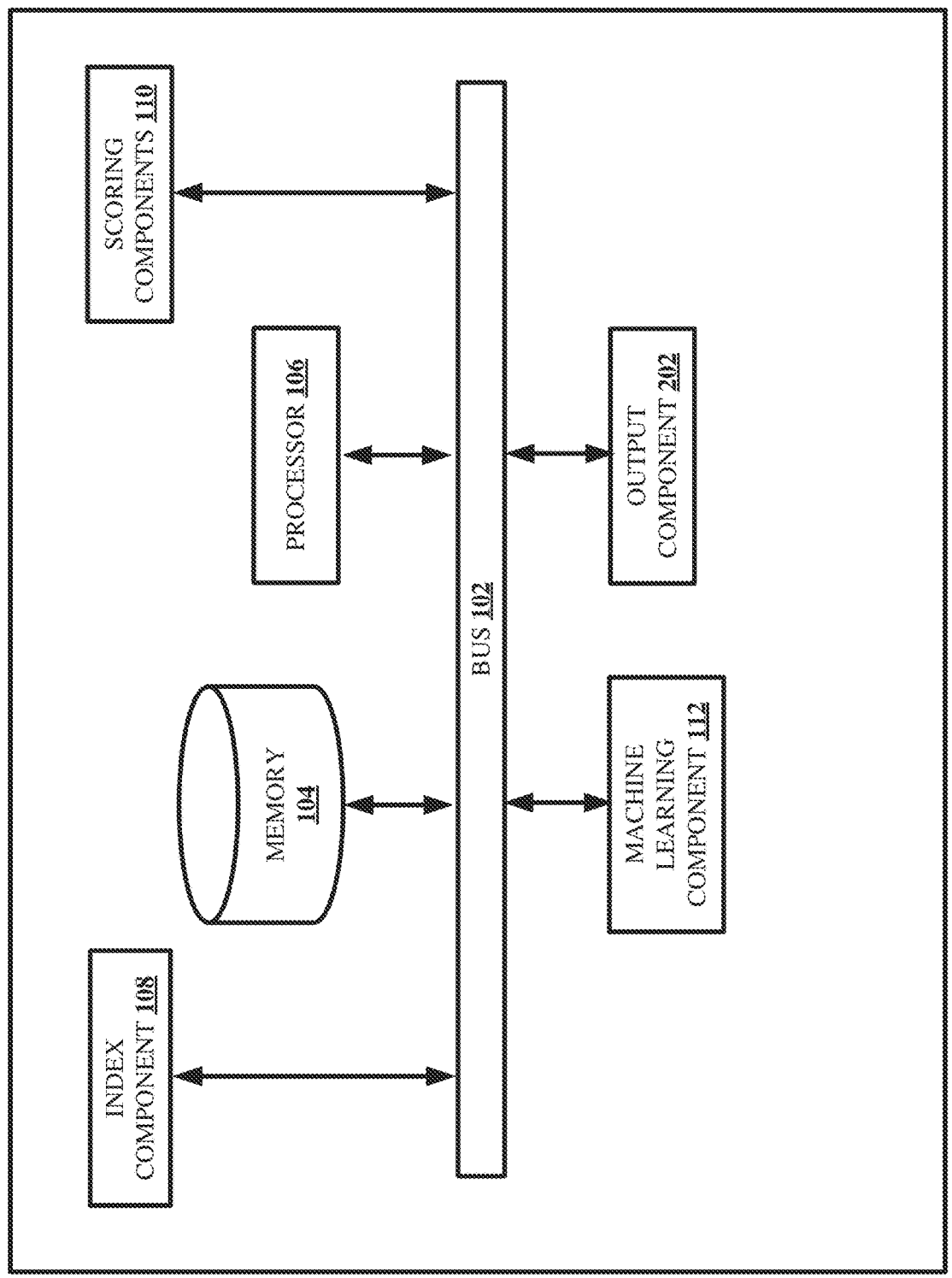
FIG. 2 illustrates a block diagram of an example, non-limiting system facilitating automatically mapping different data types including an output component in accordance with one or more embodiments described herein.

FIG. 2 illustrates a block diagram of an example, non-limiting system facilitating automatically mapping different data types including the output component 202 in accordance with one or more embodiments described herein. Repetitive description of like elements employed in other embodiments described herein is omitted for sake of brevity.

The output component 202 can produce priority levels for the candidate pairs based on a determination that the confidence score (e.g., produced by the scoring components 110) is equal to or greater than a defined threshold (e.g., determined by the scoring components 110). Different data types can have different thresholds, which are usually chosen for best performance (e.g., performance that satisfies a defined criterion). For example, the candidate pairs with a higher confidence score above the defined threshold have a higher priority level over the candidate pairs with a lower confidence score that is also above the defined threshold. The candidate pairs with a confidence score below the defined threshold are not considered to be similar to the model and are not assigned a priority level. The priority levels for the candidate pairs can be used for automatic selection by a machine (e.g., mobile device, computer, etc.) or manual selection by a user. For manual selection by user interface, the final mapping pair (e.g., selected candidate pair) can be determined by the user based on the priority level results from the output component 202.

Figure 3:
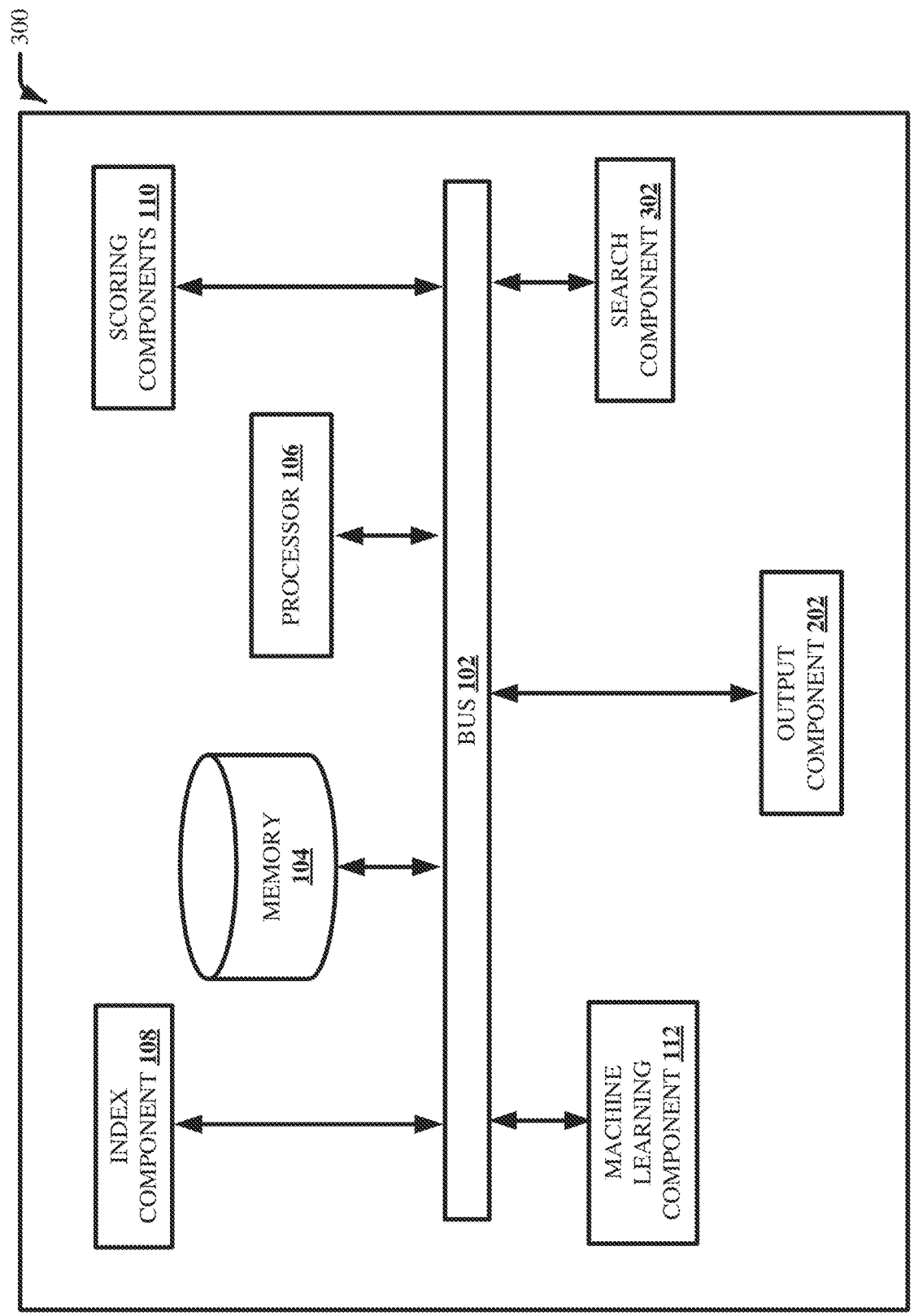
FIG. 3 illustrates a block diagram of an example, non-limiting system facilitating automatically mapping different data types including a search component in accordance with one or more embodiments described herein.

FIG. 3 illustrates a block diagram of an example, non-limiting system facilitating automatically mapping different data types including the search component 302 in accordance with one or more embodiments described herein. Repetitive description of like elements employed in other embodiments described herein is omitted for sake of brevity.

The search component 302 can search the index, constructed by the index component 108, for the candidate pairs from different data types. The candidate pairs can be searched, based on the data type and model, from the index. In response to the test data being applied to the model to be predicted, the data type can be detected. For example, the search can be based on whether the data is a textual or a non-textual data, and if the data is a non-textual data, whether the non-textual data is a numeric data or a non-numeric data. If the data is a textual data, the textual data can further be searched based on different conceptual models (e.g., conceptual names, attributes, etc.). For example, MedicationName can be selected from medication data and related features such as chemical names, medication and/or medication form, etc. The data can also be searched based on semantic such as meaning or logic. For example, a medicine can further be classified and searched based on whether the medicine is a chemical medication or a naturopathic medicine (e.g., traditional medicine (TM)).

The candidate pairs that are searched by the search component 302 can be scored by the scoring components 110. Based on how the candidate pairs are scored and ranked, the machine learning component 112 can select the candidate pairs to train the classifier models. For example, candidate pairs with confidence scores equal to or greater than the defined threshold are selected. However, if fewer than a defined number of candidate pairs are selected to train the classifier models, the scoring components 110 can modify the scoring parameters and the defined threshold based on best performance.

Figure 4:
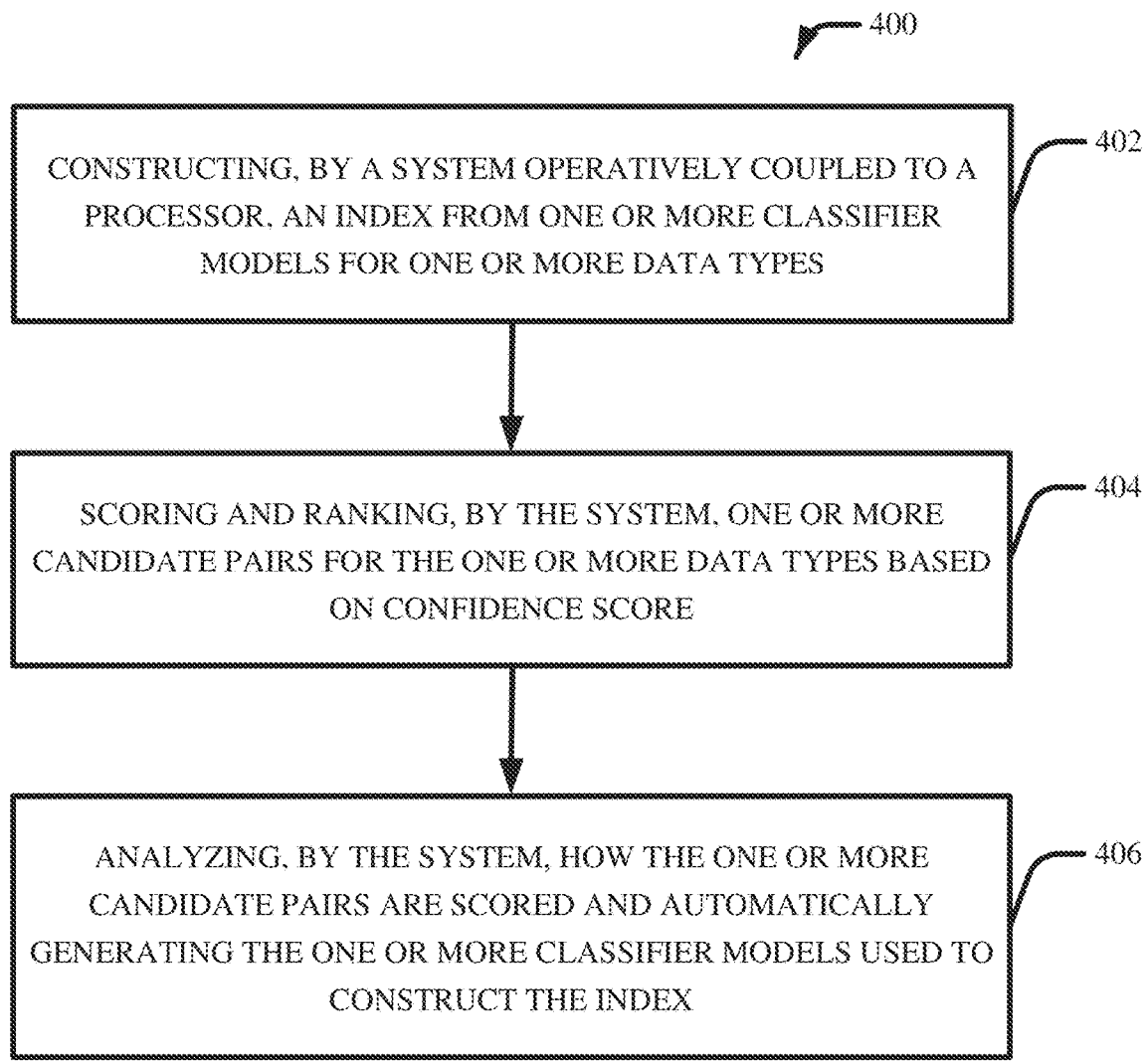
FIG. 4 illustrates an example, non-limiting computer-implemented method facilitating automatically mapping different data types including an output component in accordance with one or more embodiments described herein.

FIG. 4 illustrates an example, non-limiting computer-implemented method 400 facilitating automatically mapping different data types including an output component in accordance with one or more embodiments described herein. Repetitive description of like elements employed in other embodiments described herein is omitted for sake of brevity.

At 402, the computer-implemented method 400 can comprise constructing, by a system operatively coupled to a processor (e.g., via the index component 108), an index from one or more classifier models for one or more data types. The test data can be applied to the models to be predicted, and the data type can be detected. The index can be searched (e.g., via the search component 302) to find the candidate pairs for one or more column of new data sets. At 404, the computer-implemented method 400 can comprise scoring and ranking, by the system (e.g., via the scoring components 110), one or more candidate pairs for the one or more data types based on confidence score. The confidence score can be based on the SVM score or logistic sigmoid score for textual data. For numerical data, the confidence score can be based on the p-value for the Kolmogorov-Smirnov test. At 406, the computer-implemented method 400 can comprise analyzing, by the system (e.g., via the machine learning component 112), how the one or more candidate pairs are scored and automatically generating the one or more classifier models used to construct the index. For example, the candidate pairs with high confidence scores or high priority levels can be employed in the selection of the candidate pairs to be used as training data to train classifier models.

Figure 5:
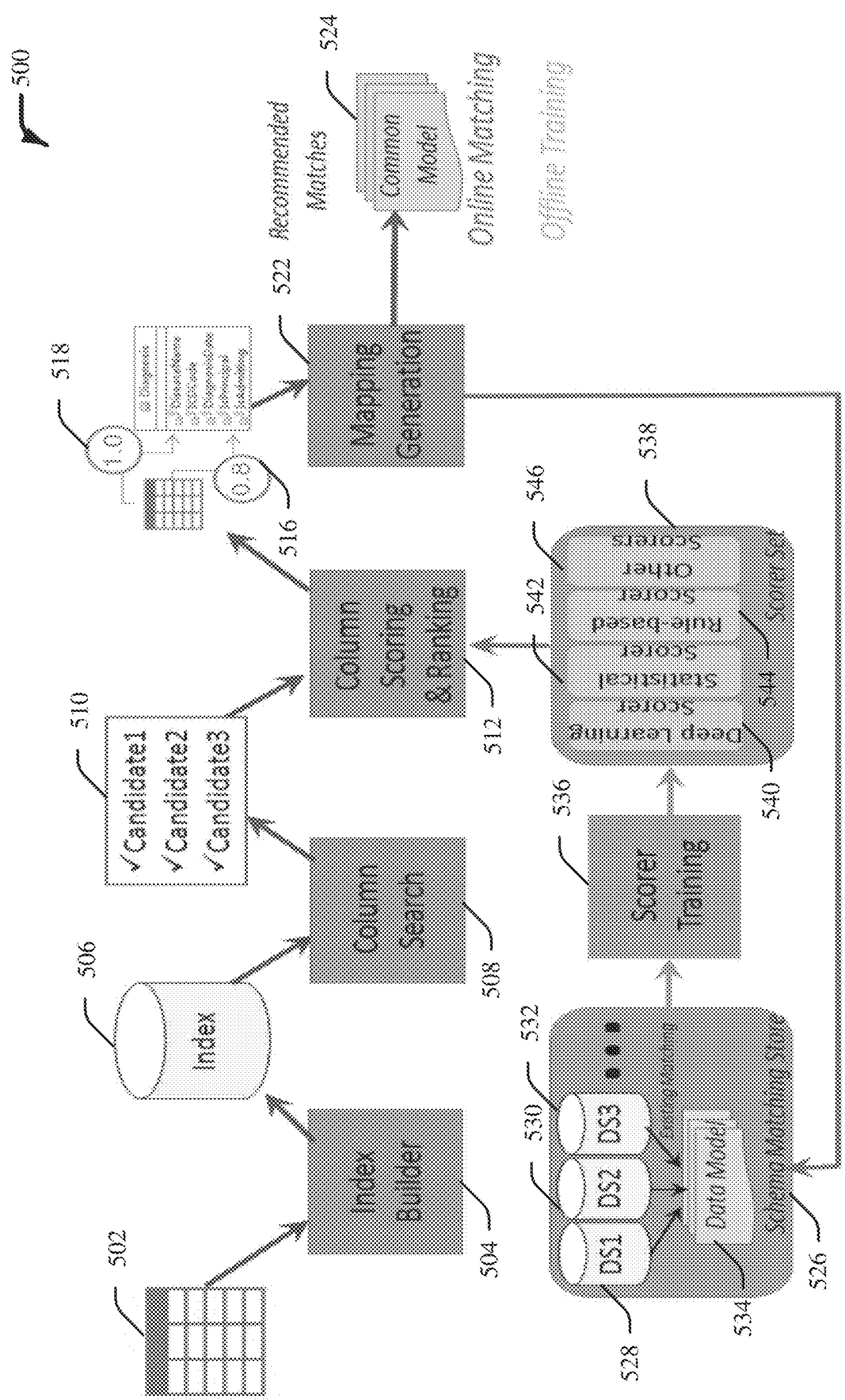
FIG. 5 illustrates a block diagram of an example, non-limiting methodology facilitating automatically mapping different data types in accordance with one or more embodiments described herein.

FIG. 5 illustrates a block diagram of an example, non-limiting methodology 500 that can facilitate automatically mapping different data types in accordance with one or more embodiments described herein. Repetitive description of like elements employed in other embodiments described herein is omitted for sake of brevity.

To learn from the data, the training data 502 can be built into an index such as index 506 by index builder 504 (e.g., index component 108). When the test data (not shown) is applied to the models (not shown) to be predicted, the data type can be detected by the column search 508 (e.g., search component 302). Based on the data type, the models (not shown) can be searched and compared with the test data 502. The column search 508 (e.g., search component 302) can search the index 506 for one or more column of new data sets to find the candidate pairs 510. The column scoring & ranking 512 (e.g., scoring components 110) can score and rank the candidate pairs 510 based on confidence scores.

The confidence score for textual data can be the SVM score or logistic sigmoid score, and the confidence score for numerical data can be the p-value for the Kolmogorov-Smirnov test. A confidence score that is equal to or greater than the defined threshold indicates that there is a match, and more specifically, that the candidate pairs from the test data is similar to the models. Based on the determination that the confidence score is equal to or greater than the defined threshold, the output component 202 (not shown) can produce priority levels (e.g., score 516 and score 518). Score 516 and score 518 (which are 0.8 and 1.0, respectively) are the confidence scores for mapping candidate pairs. The mapping generation 522 (e.g., machine learning component 112) can collect data on how the candidate pairs are scored and ranked and automatically generate maps (not shown) that can be used to automatically generate the common model 524 (e.g., models). The common model 524 can be used for online matching (e.g., actively learning, searching, matching the data, etc.) and offline training (e.g., collecting data, building models, training the data, etc.). Offline training can be employed to build models offline, which can utilize traditional learning methods or deep learning methods. The training process can take time and/or consume memory or CPU/GPU (Central Processing Unit/Graphics Processing Unit) resources. The built models can be used in online matching.

Existing matching indicating similarities between the candidate pairs from the test data can be stored in a knowledge database or the schema matching store 526 (e.g., via the machine learning component 112) to facilitate automatically generating maps (not shown) and common model 524 (e.g., models). Data set 1 (DS1 528), data set 2 (DS2 530), data set 3 (DS3 532), etc., are data sets (e.g., candidate pairs from the test data) that have confidence scores equal to or greater than the defined threshold. The data sets (e.g., DS1 528, DS2 530, DS3 532, etc.) can be stored as data model 534 (e.g., classifier models) for scorer training 536 (e.g., training the data). The scorer training 536 can be stored in the form of scorer set 538. The scorer set 538 can be used by the column scoring & ranking 512 (e.g., scoring components 110) to score and rank candidate pairs. The scorer set 538 can include, but is not limited to, deep learning scorer 540, statistical scorer 542, rule-based scorer 544, and other scorers 546. To match the candidate pairs, different methods can be employed such as deep learning methods, statistical methods, rule-based methods, etc. Based on these methods, the scorers can be built for calculating the confidence score.

Figure 6:
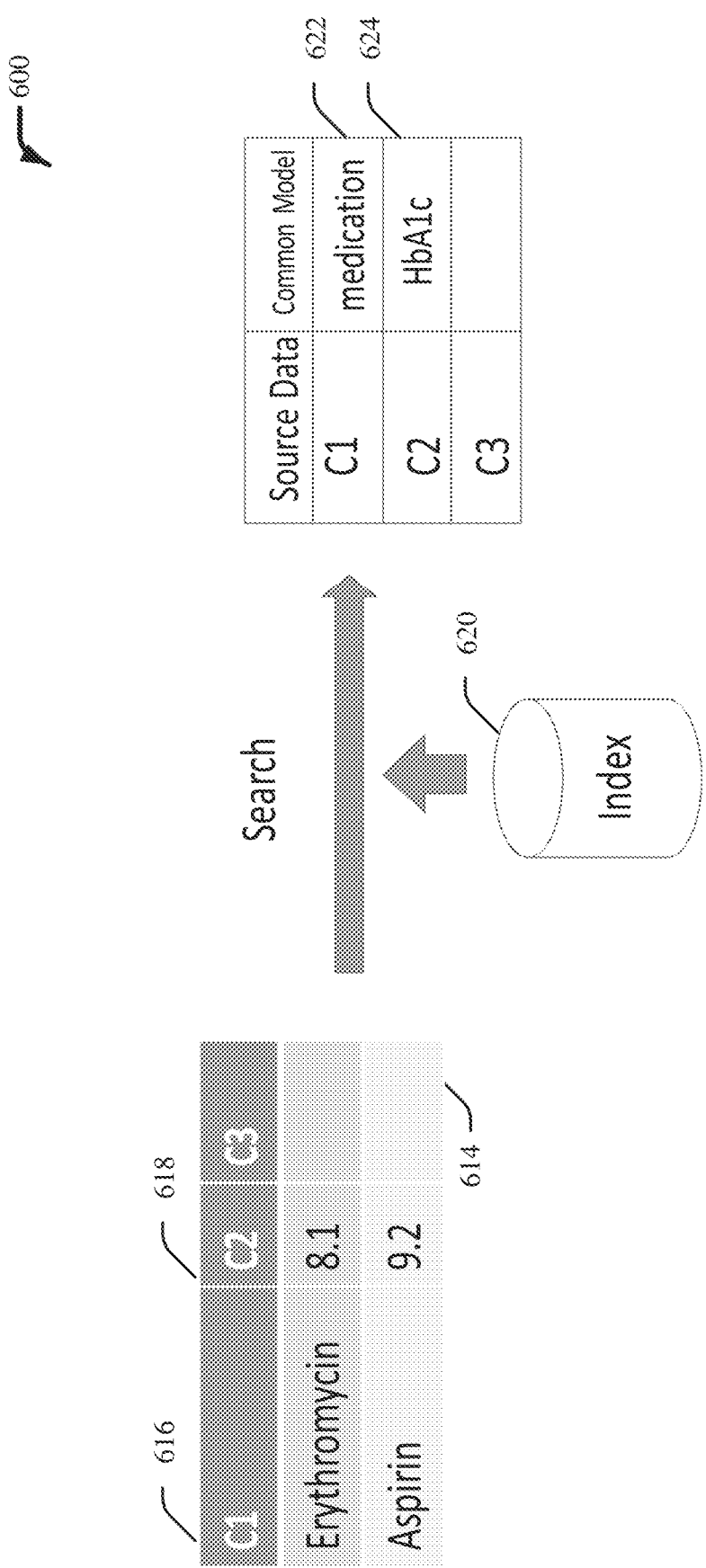
FIG. 6 illustrates a block diagram of an example, non-limiting methodology facilitating searching an index in accordance with one or more embodiments described herein.
Figure 7:
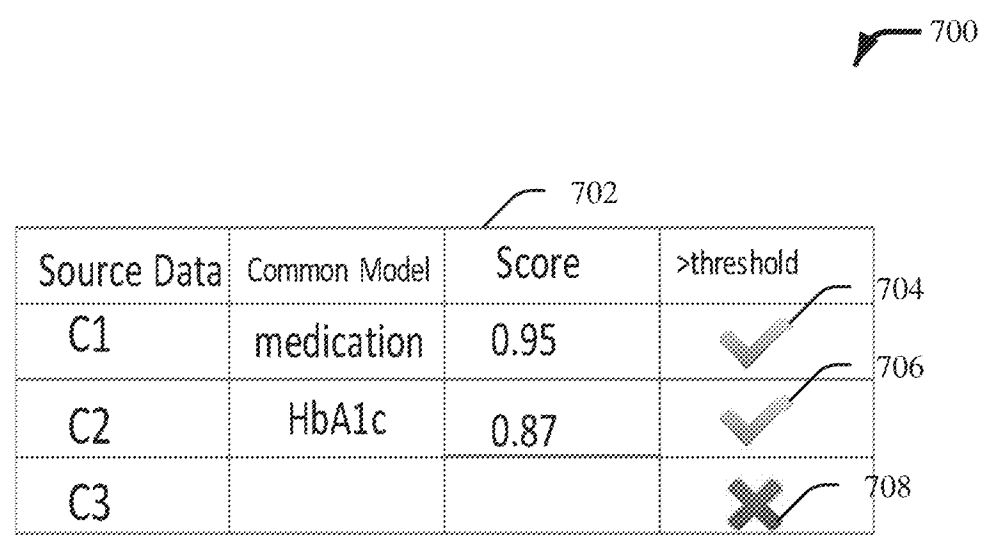

FIGS. 6 and 7 illustrate methodologies facilitating learning from the data. Repetitive description of like elements employed in other embodiments described herein is omitted for sake of brevity.

FIG. 6 illustrates a block diagram of an example, non-limiting methodology 600 facilitating searching an index in accordance with one or more embodiments described herein.

To learn from the data, the index component 108 can build index 614 from the training data for respective data types. For example, column 1 (C1 616) indicates a data type that is known as medications or can be labeled as Medication-Name. Column 2 (C2 618) is another data type that can be labeled as HbA1c (glycated haemoglobin). For a column of new data set, the search component 302 can search the index 620 and find the candidate pairs 622 and the candidate pairs 624. The candidate pairs 622 is from C1 616, which are medications or MedicationName. The candidate pairs 624 is from C2 618, which are HbA1c. HbA1c refers to glycated haemoglobin, which identifies average plasma glucose concentration. By measuring the glycated haemoglobin (HbA1c), clinicians are able to get an overall picture of what a person's average blood sugar levels have been over a period of weeks/months. For people with diabetes, this is important as the higher the HbA1c, the greater the risk of developing diabetes-related complications.

FIG. 7 illustrates a block diagram of an example, non-limiting methodology 700 facilitating scoring candidate pairs in accordance with one or more embodiments described herein. For further learning of the data, the scoring components 110 can produce confidence scores 702 (e.g., score 0.95 and score 0.87), and the output component 202 can produce priority levels based on the confidence scores 702. The confidence score for textual data can be calculated using the SVM score or logistic sigmoid score. The confidence score for numerical data can be calculated using the p-value for the Kolmogorov-Smirnov test. The output component 202 can produce priority levels and indicate with the mark 704 and the mark 706 that the scores 0.95 and 0.87, respectively, are equal to or greater than the defined threshold, which means that the candidate pairs are similar to the models. The mark 708 can be used to indicate that the confidence score is below the defined threshold or, as shown here, there is no score. A synthesis method can be employed for learning from the data, and a column can have multiple scorers. For example, a set of data can have more than one candidate pairs that can be scored based on different data types and semantic meaning or logic. More specifically, a candidate pair can have several scores calculated by the different scorers, and the synthesis method can be performed by using the different scores to produce a synthesis score based on the function max, average, weighted average, etc.

Figure 8:
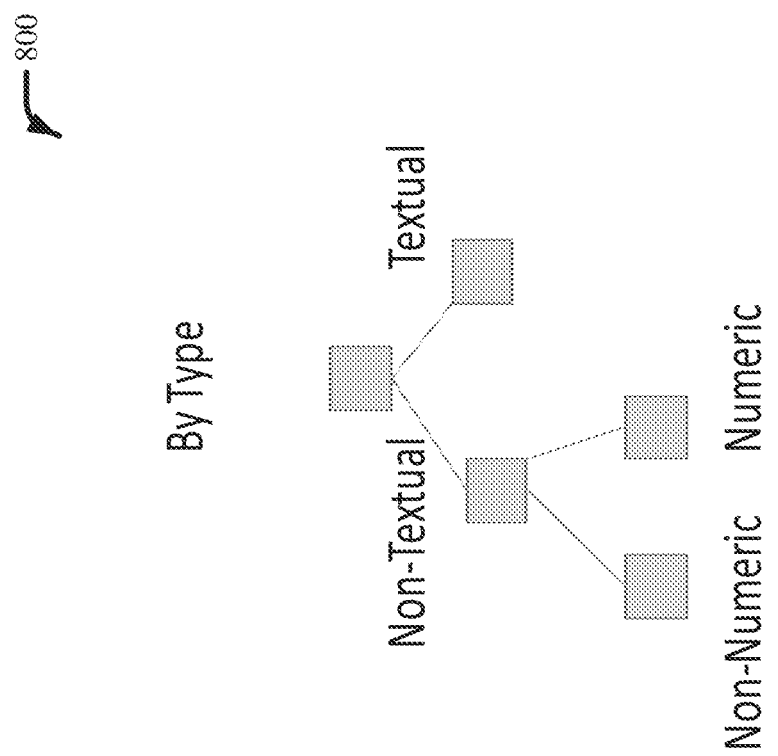
FIGS. 8 and 9 illustrate block diagrams of example, non-limiting hierarchy trees facilitating automatically mapping different data types in accordance with one or more embodiments described herein.
Figure 9:
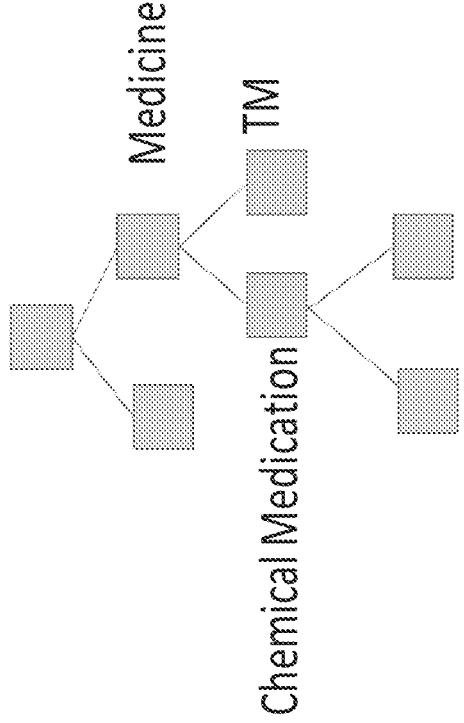

FIGS. 8 and 9 illustrate a block diagram of an example, non-limiting hierarchy tree 800 and hierarchy tree 900, respectively, facilitating automatically mapping different data types in accordance with one or more embodiments described herein. Repetitive description of like elements employed in other embodiments described herein is omitted for sake of brevity.

The hierarchy tree 800 can categorize the data into types and has a scorer, Scorer 1. The data can be categorized based on whether the data is textual or non-textual. Non-textual data can be further categorized into non-numeric and numeric data. The hierarchy tree 900 categorizes the data into semantic based on meaning or logic and has a scorer, Scorer 2. For example, for the data that is labeled as Medicine, the data can be further categorized into chemical medication or naturopathic medicine (e.g., traditional medicine (TM)).

FIGS. 10 through 13 illustrate block diagrams of methodologies facilitating training the data. Repetitive description of like elements employed in other embodiments described herein is omitted for sake of brevity.

Figure 10:
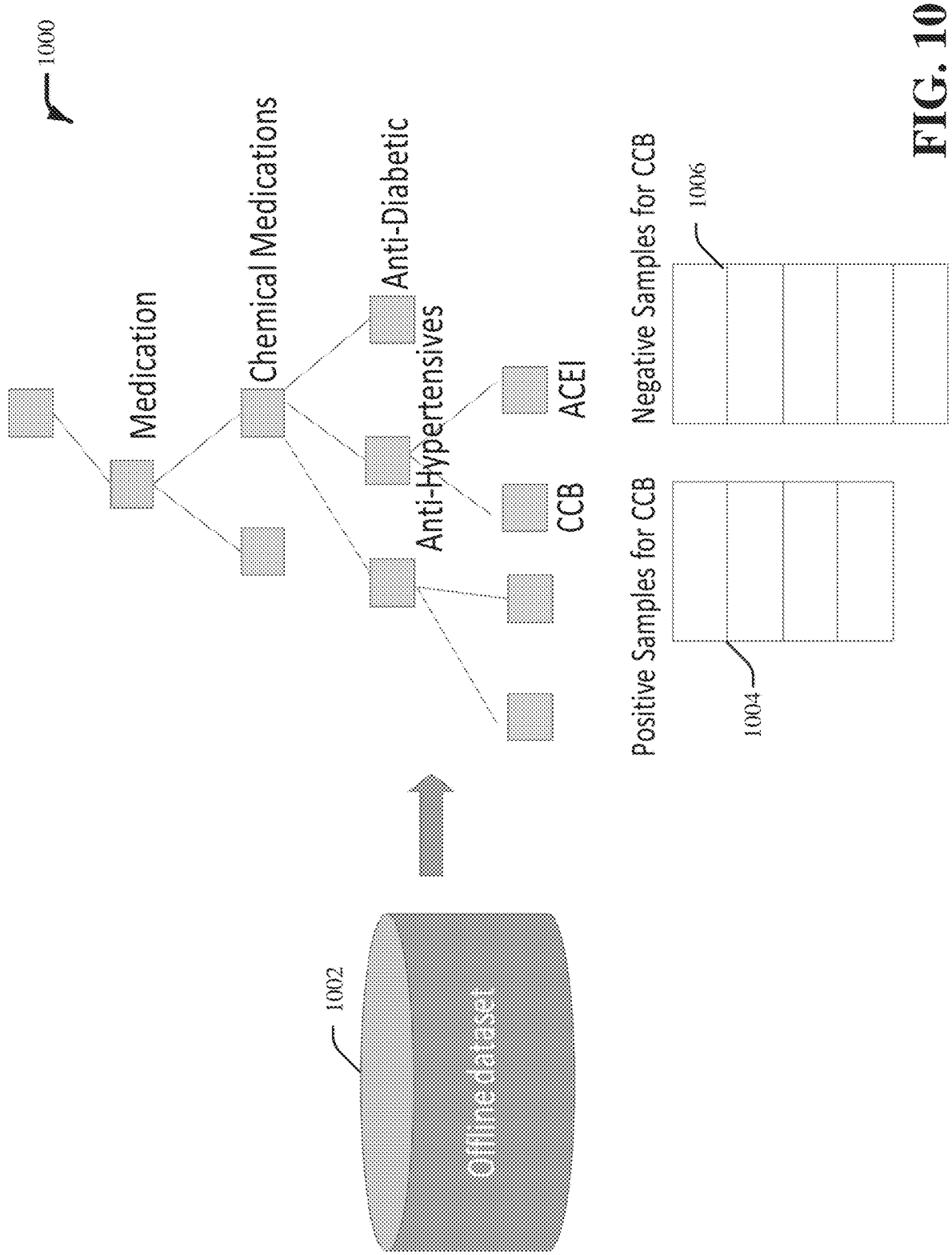
FIG. 10 illustrates a block diagram of an example, non-limiting methodology facilitating building classifier models in accordance with one or more embodiments described herein.

FIG. 10 illustrates a block diagram of an example, non-limiting methodology 1000 facilitating building classifier models in accordance with one or more embodiments described herein. The machine learning component 112 can collect corpus for a given ontology for classification of the nodes. The corpus in this example methodology 1000 is represented as offline dataset 1002. The machine learning component 112 can employ the offline dataset 1002 to construct balanced samples for efficient classification and build classifier models for the nodes. For example, the node medication can be categorized into whether the data is chemical medications. The node chemical medications can be categorized into Anti-Hypertensives and Anti-Diabetic. For Anti-Hypertensives, the data can be further categorized into calcium channel blockers (CCB) and angiotensin-converting enzyme inhibitors (ACEI). For the node CCB, the machine learning component 112 can build classifier model 1004 and classifier 1006. The classifier model 1004 is positive samples for CCB with confidence scores equal to or greater than the defined threshold and can be used for training new models. The classifier model 1006 is negative samples for CCB with confidence scores below the defined threshold.

Figure 11:
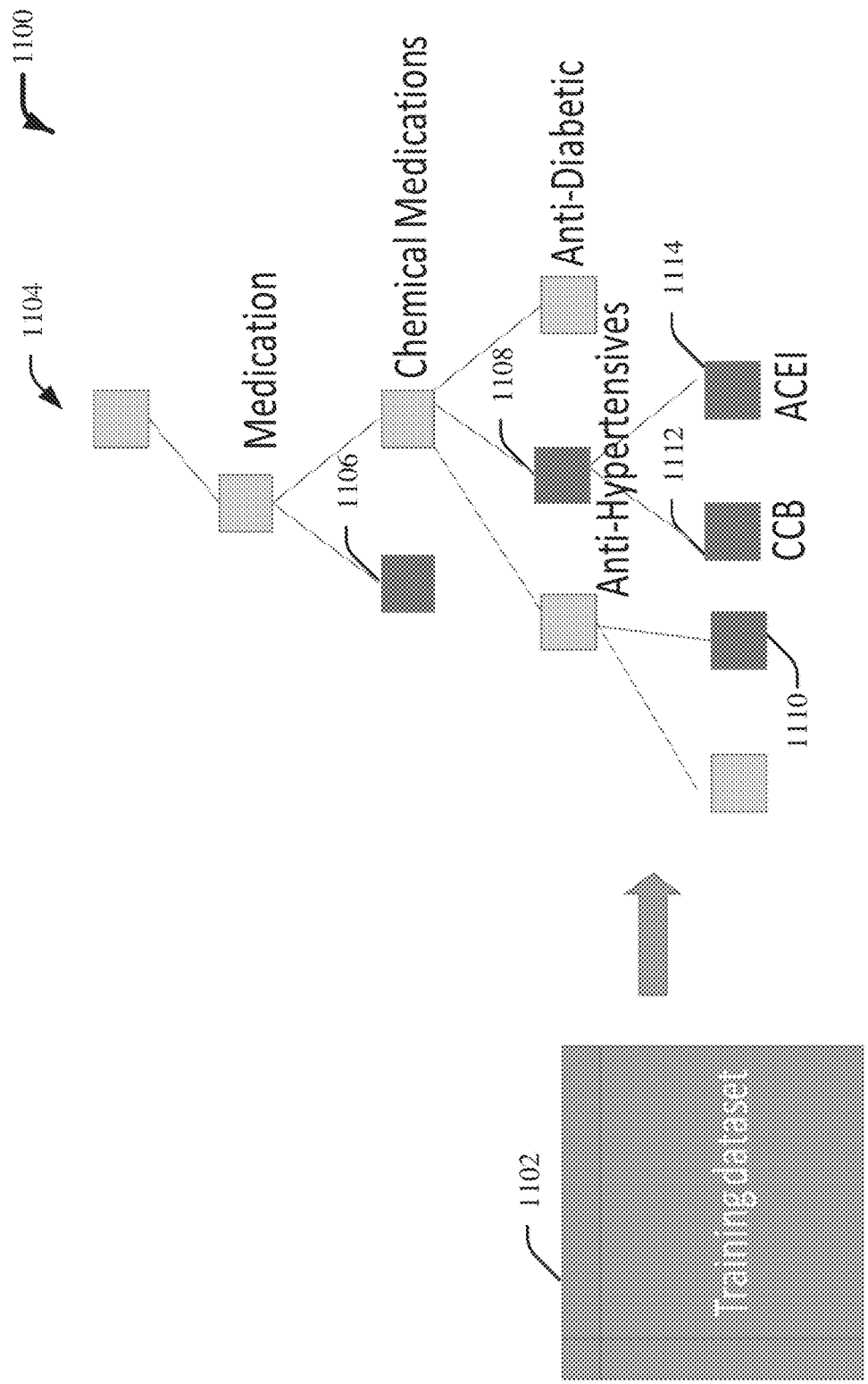
FIG. 11 illustrates a block diagram of an example, non-limiting methodology facilitating training active nodes in accordance with one or more embodiments described herein.

FIG. 11 illustrates a block diagram of an example, non-limiting methodology 1100 facilitating training active nodes in accordance with one or more embodiments described herein. The machine learning component 112 can apply the new data set (e.g., training dataset 1102) to the models 1104 (e.g., from FIG. 10). The active nodes (e.g., nodes 1106, 1108, 1110, 1112 and 1114) can be marked by confidence scores and defined threshold. The confidence score can be calculated by the weighted sum of the percentage, AUC and the joint possibility of the active node and its successors. For textual data, the joint possibility is proportional to the TFIDF (term frequency-inverse document frequency) to reflect the significance of a word in the corpus. For numerical data, the joint possibility is the p-value to weigh the strength of the data. The AUC can be computed by moving the active nodes to their respective upper nodes or lower nodes to achieve the best AUC for an active node. The machine learning component 112 can train the active nodes and generate new models for the classifications.

Figure 12:
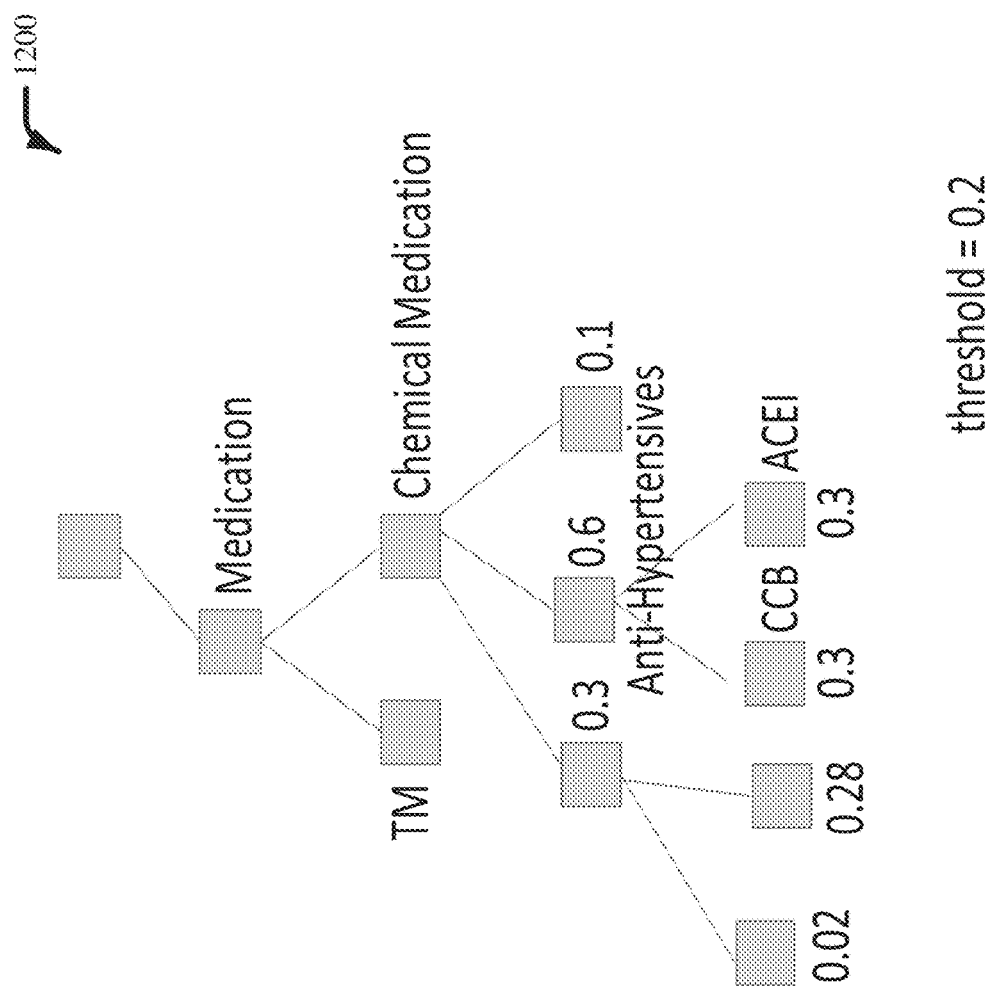
FIG. 12 illustrates a block diagram of an example, non-limiting methodology facilitating building sample anti-hypertensive classifier in accordance with one or more embodiments described herein.

FIG. 12 illustrates a block diagram of an example, non-limiting methodology 1200 facilitating building sample anti-hypertensive classifier in accordance with one or more embodiments described herein. Methodology 1200 is an example method for training textual data. The methodology 1200 has as a step, constructing a balanced corpus from a medical ontology and training the data by labeling the data with ontology nodes. To train a classifier for Anti-Hypertensives, positive and negative samples can be constructed. The training set can contain both CCB and ACEI, which are both categorized under Anti-Hypertensives. The method can include applying the Anti-Hypertensives classifier to the data to calculate the confidence score. Given that the threshold is 0.2, if a node has a confidence score less than 0.2, the node can be considered to be performing poorly. If a node is performing poorly, the machine learning component 112 can construct a new classifier, which is the upper level node on the ontology or hierarchy tree.

Figure 13:
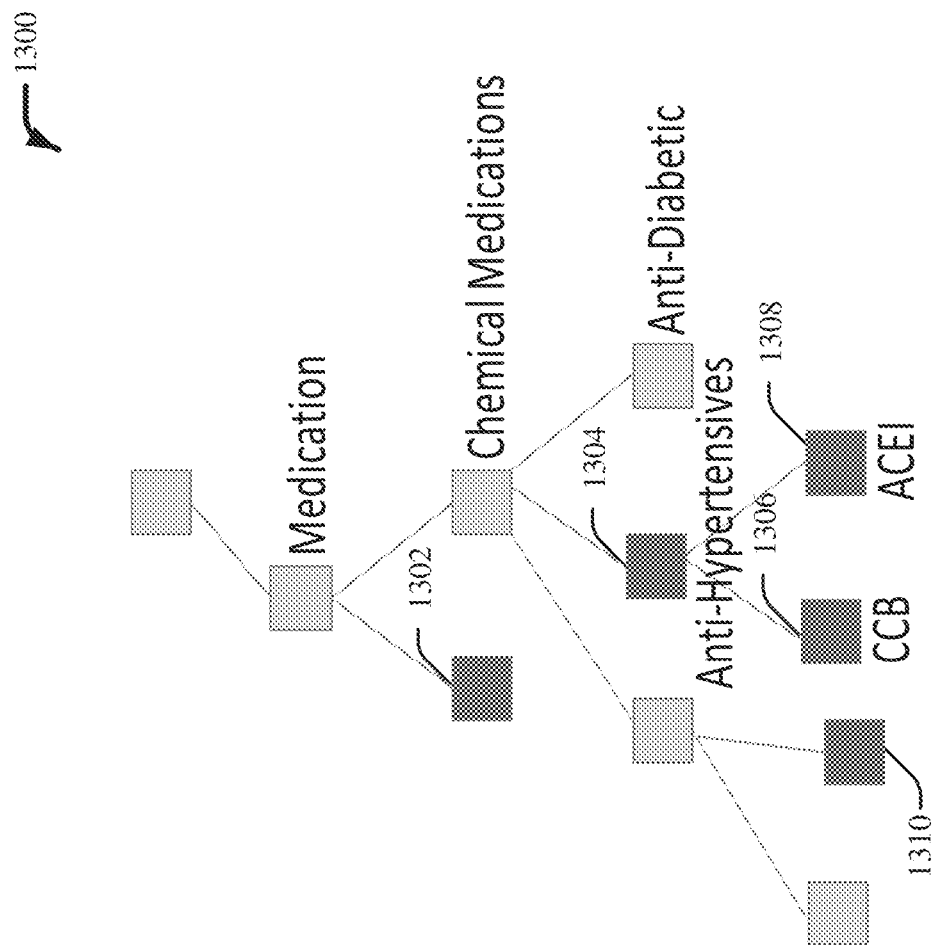
FIG. 13 illustrates a block diagram of an example, non-limiting methodology facilitating training sample calcium channel blockers (CCB) active node in accordance with one or more embodiments described herein.

FIG. 13 illustrates a block diagram of an example, non-limiting methodology 1300 for training textual data. More specifically, methodology 1300 can facilitate training sample calcium channel blockers (CCB) active node in accordance with one or more embodiments described herein. To train the CCB active node, the machine learning component 112 can construct a balanced corpus as in methodology 1200 from FIG. 12. The new classifier can be trained for the CCB active node to generate a new model for the same node, and if the confidence score is still below the defined threshold then continue to move to a more upper level node. If there are only a few nodes selected (e.g., only a few nodes meet the defined threshold), the scoring parameters and the defined threshold can be modified (e.g., via the scoring components 110) and the methodology 1200 and methodology 1300 can be repeated.

Figure 14:
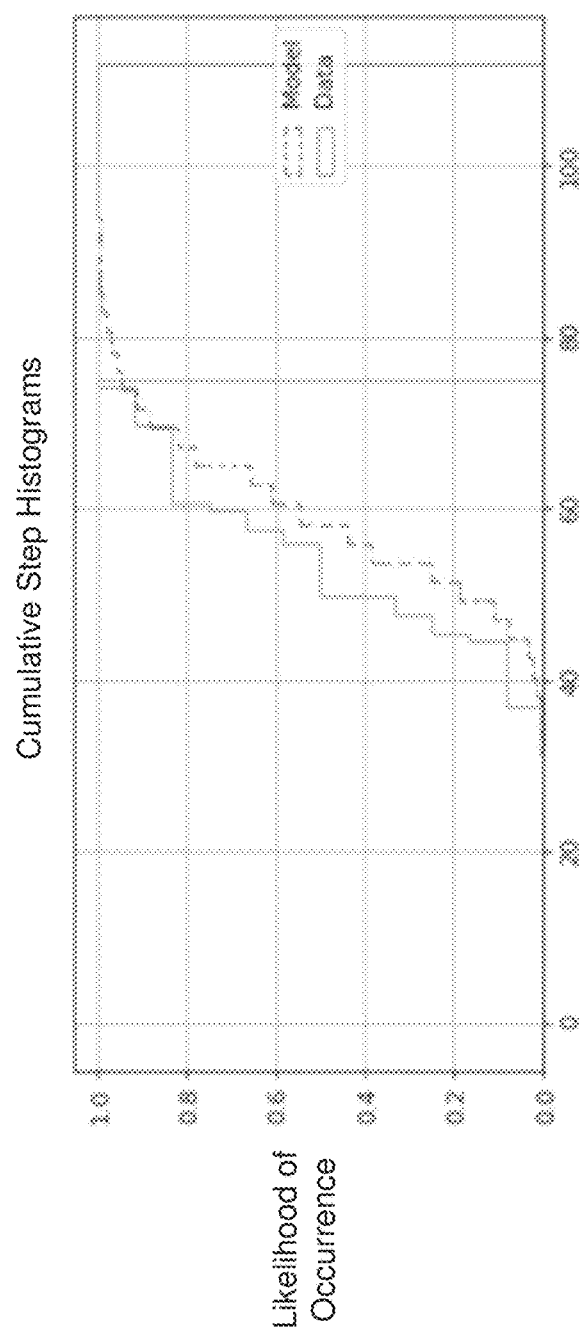
FIGS. 14 and 15 illustrate example, non-limiting graphs facilitating hypothesis testing in accordance with one or more embodiments described herein.
Figure 15:
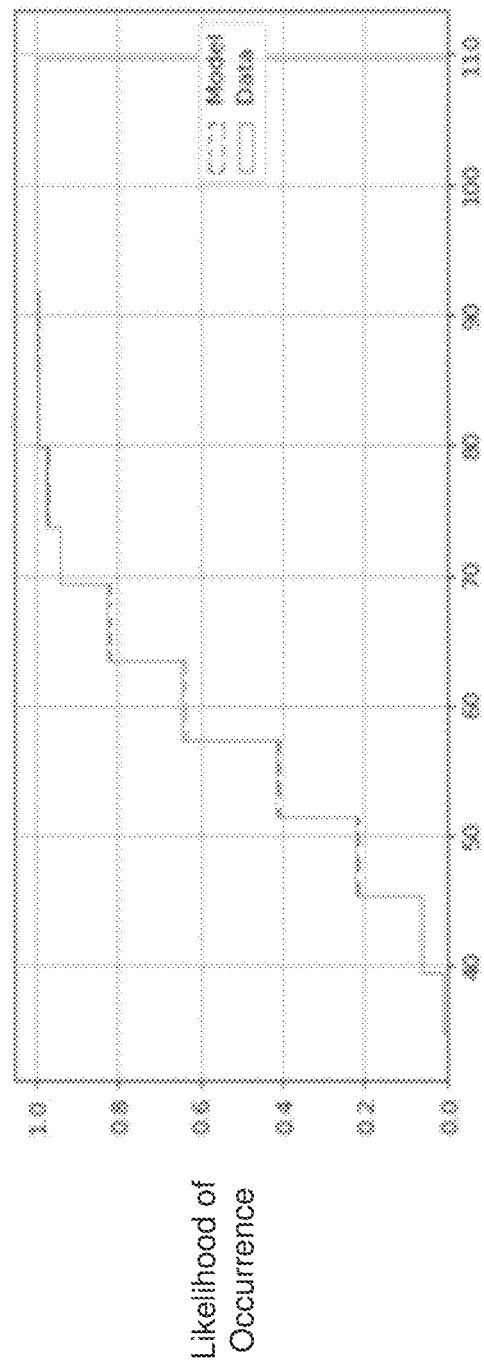

FIGS. 14 and 15 illustrate example, non-limiting graph 1400 and graph 1500 facilitating hypothesis testing in accordance with one or more embodiments described herein. Repetitive description of like elements employed in other embodiments described herein is omitted for sake of brevity.

The results of graph 1400 and graph 1500 can facilitate the training of numerical data. For numerical nodes (e.g., similar to FIGS. 12 and 13 except for numerical data rather than textual data), a statistical hypothesis test such as the Kolmogorov-Smirnov test can be used for checking the similarity between two distributions. For example, for body weight, the distribution can be tested and the p-value is for the measurement of the similarity as illustrated in graph 1400. If the distributions are not similar, the distribution can be increased by 5 so that the new distribution can be large enough to judge the similarity as illustrated in graph 1500 from FIG. 15. If no similarity between the two distributions can be found, the scoring parameters and the defined threshold can be modified or adjusted (e.g., via the scoring components 110) for more iterations (e.g., repeating the learning and training method).

Figure 16:
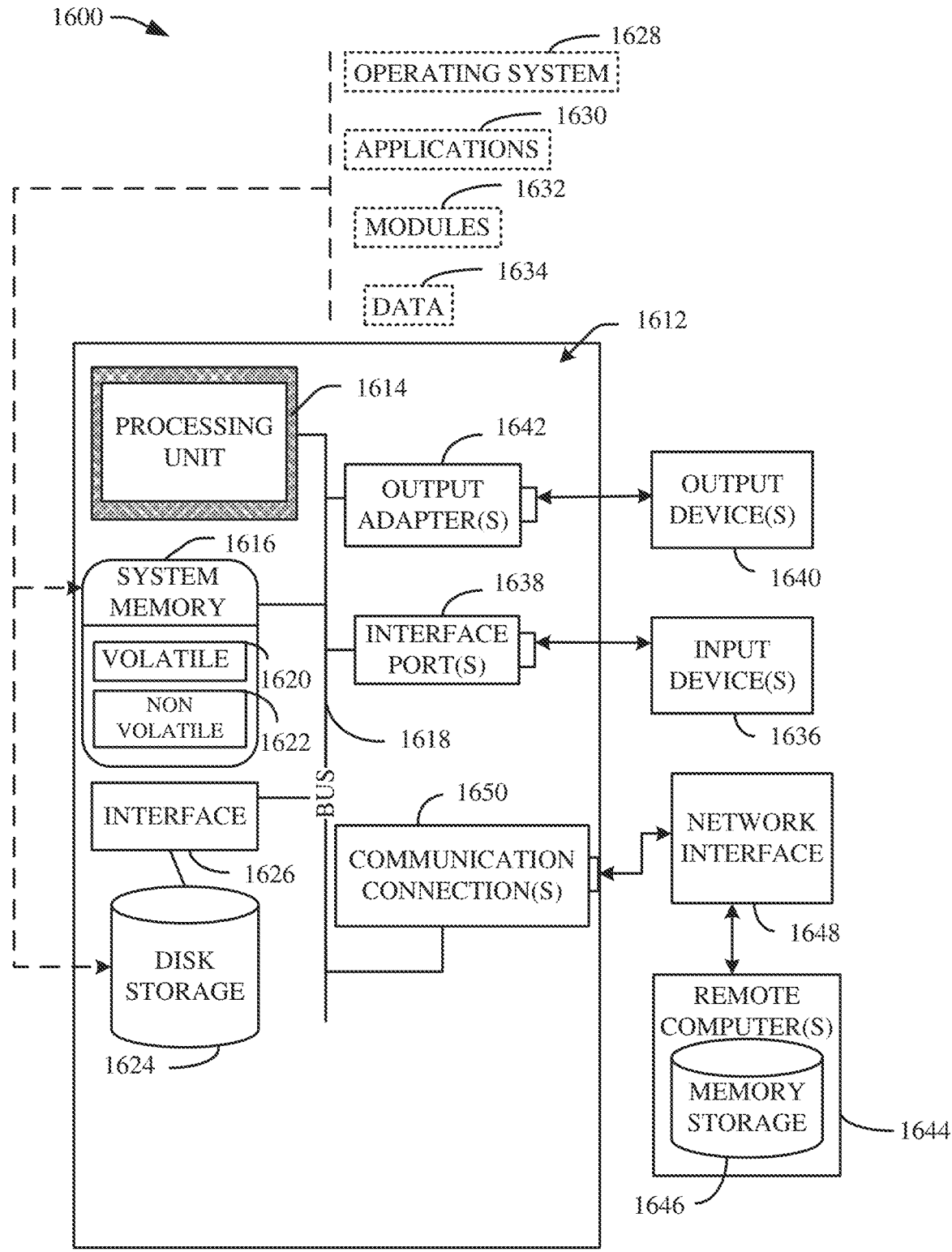
FIG. 16 illustrates a block diagram of an example, non-limiting operating environment in which one or more embodiments described herein can be facilitated.

To provide a context for the various aspects of the disclosed subject matter, FIG. 16 as well as the following discussion are intended to provide a general description of a suitable environment in which the various aspects of the disclosed subject matter can be implemented. FIG. 16 illustrates a block diagram of an example, non-limiting operating environment in which one or more embodiments described herein can be facilitated. Repetitive description of like elements employed in other embodiments described herein is omitted for sake of brevity.

With reference to FIG. 16, a suitable operating environment 1600 for implementing various aspects of this disclosure can also include a computer 1612. The computer 1612 can also include a processing unit 1614, a system memory 1616, and a system bus 1618. The system bus 1618 couples system components including, but not limited to, the system memory 1616 to the processing unit 1614. The processing unit 1614 can be any of various available processors. Dual microprocessors and other multiprocessor architectures also can be employed as the processing unit 1614. The system bus 1618 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Firewire (IEEE 1394), and Small Computer Systems Interface (SCSI).

The system memory 1616 can also include volatile memory 1620 and nonvolatile memory 1622. The basic input/output system (BIOS), containing the basic routines to transfer information between elements within the computer 1612, such as during start-up, is stored in nonvolatile memory 1622. Computer 1612 can also include removable/non-removable, volatile/non-volatile computer storage media. FIG. 16 illustrates, for example, a disk storage 1624.

Disk storage 1624 can also include, but is not limited to, devices like a magnetic disk drive, floppy disk drive, tape drive, Jaz drive, Zip drive, LS-100 drive, flash memory card, or memory stick. The disk storage 1624 also can include storage media separately or in combination with other storage media. To facilitate connection of the disk storage 1624 to the system bus 1618, a removable or non-removable interface is typically used, such as interface 1626. FIG. 16 also depicts software that acts as an intermediary between users and the basic computer resources described in the suitable operating environment 1600. Such software can also include, for example, an operating system 1628. Operating system 1628, which can be stored on disk storage 1624, acts to control and allocate resources of the computer 1612.

System applications 1630 take advantage of the management of resources by operating system 1628 through program modules 1632 and program data 1634, e.g., stored either in system memory 1616 or on disk storage 1624. It is to be appreciated that this disclosure can be implemented with various operating systems or combinations of operating systems. A user enters commands or information into the computer 1612 through input device(s) 1636. Input devices 1636 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1614 through the system bus 1618 via interface port(s) 1638. Interface port(s) 1638 include, for example, a serial port, a parallel port, a game port, and a universal serial bus (USB). Output device(s) 1640 use some of the same type of ports as input device(s) 1636. Thus, for example, a USB port can be used to provide input to computer 1612, and to output information from computer 1612 to an output device 1640. Output adapter 1642 is provided to illustrate that there are some output devices 1640 like monitors, speakers, and printers, among other output devices 1640, which require special adapters. The output adapters 1642 include, by way of illustration and not limitation, video and sound cards that provide a means of connection between the output device 1640 and the system bus 1618. It should be noted that other devices and/or systems of devices provide both input and output capabilities such as remote computer(s) 1644.

Computer 1612 can operate in a networked environment using logical connections to one or more remote computers, such as remote computer(s) 1644. The remote computer(s) 1644 can be a computer, a server, a router, a network PC, a workstation, a microprocessor based appliance, a peer device or other common network node and the like, and typically can also include many or all of the elements described relative to computer 1612. For purposes of brevity, only a memory storage device 1646 is illustrated with remote computer(s) 1644. Remote computer(s) 1644 is logically connected to computer 1612 through a network interface 1648 and then physically connected via communication connection 1650. Network interface 1648 encompasses wire and/or wireless communication networks such as local-area networks (LAN), wide-area networks (WAN), cellular networks, etc. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1650 refers to the hardware/software employed to connect the network interface 1648 to the system bus 1618. While communication connection 1650 is shown for illustrative clarity inside computer 1612, it can also be external to computer 1612. The hardware/software for connection to the network interface 1648 can also include, for exemplary purposes only, internal and external technologies such as, modems including regular telephone grade modems, cable modems and DSL modems, ISDN adapters, and Ethernet cards.

The present invention may be a system, a method, an apparatus and/or a computer program product at any possible technical detail level of integration. The computer program product can include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks. The computer readable program instructions can also be loaded onto a computer, other programmable data processing apparatus, or other device to cause a series of operational acts to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the subject matter has been described above in the general context of computer-executable instructions of a computer program product that runs on a computer and/or computers, those skilled in the art will recognize that this disclosure also can or can be implemented in combination with other program modules. Generally, program modules include routines, programs, components, data structures, etc., that perform particular tasks and/or implement particular abstract data types. Moreover, those skilled in the art will appreciate that the inventive computer-implemented methods can be practiced with other computer system configurations, including single-processor or multiprocessor computer systems, mini-computing devices, mainframe computers, as well as computers, hand-held computing devices (e.g., PDA, phone), microprocessor-based or programmable consumer or industrial electronics, and the like. The illustrated aspects can also be practiced in distributed computing environments in which tasks are performed by remote processing devices that are linked through a communications network. However, some, if not all aspects of this disclosure can be practiced on stand-alone computers. In a distributed computing environment, program modules can be located in both local and remote memory storage devices.

As used in this application, the terms "component," "system," "platform," "interface," and the like, can refer to and/or can include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor can also be implemented as a combination of computing processing units. In this disclosure, terms such as "store," "storage," "data store," "data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory, or non-volatile random access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM (RDRAM). Additionally, the disclosed memory components of systems or computer-implemented methods herein are intended to include, without being limited to including, these and any other suitable types of memory.

What has been described above include mere examples of systems and computer-implemented methods. It is, of course, not possible to describe every conceivable combination of components or computer-implemented methods for purposes of describing this disclosure, but one of ordinary skill in the art can recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system, comprising:
   a memory;
   a processor, operably coupled to the memory, and the memory, wherein the processor:
   constructs an index from one or more classifier models for one or more data types;
   scores and ranks one or more candidate pairs for the one or more data types based on confidence score;
   searches the index for the one or more candidate pairs from the one or more data types;
   analyzes how the one or more candidate pairs are scored and automatically generates the one or more classifier models used to construct the index; and
   selects the one or more candidate pairs to train the one or more classifier models based on an analysis of how the one or more candidate pairs are scored by comparing different confidence scores from the one or more classifier models of the one or more data types.

2. The system of claim 1, wherein the processor collects data used to generate the one or more classifier models.

3. The system of claim 1, wherein the processor automatically generates one or more maps used to automatically generate the one or more classifier models.

4. The system of claim 1, wherein the processor produces priority levels for the one or more candidate pairs based on a determination that the confidence score is equal to or greater than a defined threshold.

5. The system of claim 4, wherein the processor constructs a new classifier model if the confidence score of the one or more candidate pairs for the one or more data types is below the defined threshold.

6. The system of claim 1, wherein the processor modifies one or more scoring parameters and the defined threshold if the one or more candidate pairs selected to train the one or more classifier models are few.

7. A computer-implemented method, comprising:
   constructing, by a system operatively coupled to a processor, an index from one or more classifier models for one or more data types;
   scoring and ranking, by the system, one or more candidate pairs for the one or more data types based on confidence score;

searching, by the system, the index for the one or more candidate pairs from the one or more data types;

analyzing, by the system, how the one or more candidate pairs are scored and automatically generating the one or more classifier models used to construct the index; and selecting, by the system, the one or more candidate pairs to train the one or more classifier models based on an analysis of how the one or more candidate pairs are scored by comparing different confidence scores from the one or more classifier models of the one or more data types.

8. The computer-implemented method of claim 7, further comprising using the machine learning component to automatically generate one or more maps used to automatically generate the one or more classifier models.

9. The computer-implemented method of claim 7, further comprising using an output component to produce priority levels for the one or more candidate pairs based on a determination that the confidence score is equal to or greater than a defined threshold.

10. The computer-implemented method of claim 9, further comprising using the machine learning component to construct a new classifier model if the confidence score of the one or more candidate pairs for the one or more data types is below the defined threshold.

11. A computer program product for facilitating automatically mapping different data types, the computer program product comprising a computer readable storage medium having program instructions embodied therewith, the program instructions executable by a processor to cause the processor to:

construct an index from one or more classifier models for one or more data type;

score and rank one or more candidate pairs for the one or more data types based on confidence score;

search the index for the one or more candidate pairs from the one or more data types;

analyze how the one or more candidate pairs are scored and automatically generate the one or more classifier models used to construct the index; and select the one or more candidate pairs to train the one or more classifier models based on an analysis of how the one or more candidate pairs are scored by comparing different confidence scores from the one or more classifier models of the one or more data types.

12. The computer program product of claim 11, wherein the program instructions are further executable to cause the processor to:

automatically generate one or more maps used to automatically generate the one or more classifier models.

13. The computer program product of claim 11, wherein the program instructions are further executable to cause the processor to:

produce priority levels for the one or more candidate pairs based on a determination that the confidence score is equal to or greater than a defined threshold.

14. The computer program product of claim 13, wherein the program instructions are further executable to cause the processor to:

construct a new classifier model if the confidence score of the one or more candidate pairs for the one or more data types is below the defined threshold.

* * * * *